United States Patent [19]

Shimel

[11] Patent Number: 5,769,219
[45] Date of Patent: Jun. 23, 1998

[54] BEVERAGE STORAGE APPARATUS FOR USE WITH A GOLF BAG

[76] Inventor: Jerry W. Shimel, 14165 W. Warren Cir., Lakewood, Colo. 80228

[21] Appl. No.: 482,917

[22] Filed: Jun. 8, 1995

[51] Int. Cl.$^6$ .............................. A63B 55/00; A63B 57/00
[52] U.S. Cl. .................................... 206/315.3; 206/315.5; 206/315.6
[58] Field of Search ............................. 206/315.3, 315.5, 206/315.6

[56] References Cited

U.S. PATENT DOCUMENTS

| | | | |
|---|---|---|---|
| 1,409,323 | 3/1922 | Wells | 206/315.5 |
| 1,680,354 | 8/1928 | Williams | 206/315.6 X |
| 1,726,245 | 8/1929 | Shelton | 206/315.5 X |
| 1,956,008 | 4/1934 | Deibel | 206/315.6 |
| 2,521,573 | 9/1950 | Filler et al. | 206/315.3 |
| 3,941,398 | 3/1976 | Nelson | 206/315.6 X |
| 4,319,616 | 3/1982 | Light | 206/315.6 |
| 4,383,563 | 5/1983 | Kirchhoff, Jr. | 206/315.6 |
| 4,703,851 | 11/1987 | Stewert | 206/315.6 |
| 4,924,682 | 5/1990 | Penner | 206/315.3 X |
| 5,103,974 | 4/1992 | Antonious | 206/315.3 X |
| 5,222,598 | 6/1993 | Yamazoe | 206/315.5 X |
| 5,244,114 | 9/1993 | Traegde | 206/315.3 X |
| 5,277,328 | 1/1994 | Tocco | 206/315.3 X |

FOREIGN PATENT DOCUMENTS

| | | | |
|---|---|---|---|
| 226654 | 6/1958 | Australia | 206/315.3 |
| 2048127 | 1/1993 | Canada | 206/315.3 |

*Primary Examiner*—Sue A. Weaver
*Attorney, Agent, or Firm*—Timothy J. Martin; Michael R. Henson

[57] ABSTRACT

A beverage storage apparatus is provided which is adapted to receive a beverage container and to mount to a conventional golf bag within which shafts of plurality of golf clubs may be inserted so that the golf club is stored in the interior of the golf bag. The beverage storage apparatus comprises a collar adapted to engage a margin of the bag proximate to its rim and a receptacle operative to matably receive the beverage container and adapted to support the beverage container so that the container is prevented from dislodging during transport of a golf bag. A support structure interconnects the collar and the receptacle such that the receptacle is maintained at a fixed location relative to the golf bag by the collar. The receptacle may be formed as a frusto-conical chamber located interiorly of the golf bag's rim margin with this chamber including a spring latch mechanism operative to permit the beverage container to be stored within the receptacle in at least two discrete positions.

20 Claims, 3 Drawing Sheets

BEVERAGE STORAGE APPARATUS FOR USE WITH A GOLF BAG

FIELD OF INVENTION

The present invention generally relates to a beverage storage apparatus which is mountable to a golf bag and can be used to store a beverage container. More specifically, the present invention is directed to a beverage storage apparatus which allows a user to conveniently access a beverage container at any time during use of the golf bag.

BACKGROUND OF THE INVENTION

Since its inception, the game of golf has enjoyed widespread popularity for avid enthusiasts as well as beginners. At least one reason for golf's great appeal is that participants of all ages and skill levels may play the game, either as a competitive sport or as a social activity, without diminishing the enjoyment or the challenge for the individual participants.

The characteristics of golf are well understood. The game is played on a golf course which typically has a total of eighteen holes, each having its own distinct contours and distance. Each of the holes is designated either as a par three, four or five and the main objective for the participant is to hit a golf ball at a target pin which is located on a green a selected distance away from a tee box. This distance can range from as little as about 100 yards to a distance in excess of 600 yards. To accomplish this formidable objective, the golfer has at his/her disposal a selected number of golf clubs with which he/she hits the ball in the direction of the target pin. Each of these golf clubs has its own distinct characteristics which determine the length the ball should travel and the trajectory it will take.

Participants generally have two means of transportation while playing the game of golf. Some choose to walk and carry their golf bag throughout the excursion, while others elect to ride in a golf cart. Despite the game's rather slow pace, many participants become either fatigued or dehydrated and require a refreshment while playing. Some participants store beverage containers in the various pockets of their golf bag, while others choose to wait until they pass by the club house before enjoying a refreshment. It is not uncommon on many courses today, whether public or private, to see motorized vending carts which periodically stop to serve refreshments to patrons on the course.

Apart from these means of refreshment for golfers, there have also been various types of devices manufactured for use with golf bags which attempt to make refreshments accessible at any time during play. Some of these are quite elaborate in their construction. For example, U.S. Pat. No. 2,521,573 to Filler, issued Sep. 5, 1950, relates to a uniquely constructed golf bag which is provided with a means for receiving and carrying a thermos jar container for hot or cold beverages. U.S. Pat. No. 4,924,682 to Penner, issued May 15, 1990, teaches a beverage cooler which is provided with a pair of straps for securement around a golf bag. The cooler includes a pair of vertically oriented beverage can storage tubes each having a spring loaded base to provide access to and storage of several beverage cans. Other devices are less elaborate in construction. U.S. Pat. No. 5,244,114 to Traegde, for example, which issued on Sep. 14, 1993 teaches a drink container for holding a typical sports bottle. The sports bottle swings freely alongside the golf bag and pivots about a connection point on the golf bag to keep the bottle in a substantially upright position during transport. This helps to avoid spillage of the contents. Finally, U.S. Pat. No. 5,277,328 to Tocco, issued Jan. 11, 1994, discloses a multi-compartmentalized cooler which is releasably connectable to a golf bag cart via a handle and a strap.

While many of these prior art devices have their own unique advantages, they are somewhat limited in their practical use for the every day golfer who may have economical considerations in purchasing a golf bag and who may desire a more simplified construction, among other aspects. Accordingly, their remains a need for an improved beverage storage apparatus for use with a golf bag that provides easy accessibility to a beverage container and is lightweight. There is an additional need for such an apparatus to be simplified in construction so as not to interfere with the golfer while he/she is transporting the golf bag.

SUMMARY OF INVENTION

It is an object of the present invention to provide a new and useful beverage storage apparatus which may be readily employed either as original equipment on a golf bag or as a retrofit to an existing conventional golf bag.

Another object of the present invention is to provide a beverage storage apparatus which enables a golfer to have easy accessibility to a beverage at any time during play.

A further object of the present invention is to provide a beverage storage apparatus which is adapted to prevent spillage of the beverage while the golf bag is being transported.

Still a further object of the present invention is to provide a beverage storage apparatus which releasable supports a beverage contained within a golf bag, while allowing storage capabilities and accessibility for a variety of golf club shafts.

Yet another object of the present invention is to provide a beverage storage apparatus which is adapted to thermally insulate a beverage container stored therein, while at the same time preventing dislodgement of the container during transportation of the golf bag.

According to the present invention, then, a beverage storage apparatus is provided that is adapted to mount to a golf bag which includes a base and an elongated surrounding sidewall extending longitudinally from the base to terminate in a rim to define an interior for the golf bag. As such, the rim defines a mouth through which shafts of a plurality of golf clubs may be inserted so that the golf clubs are stored in the interior of the bag. In use, the beverage storage apparatus is adapted to receive a beverage container in such a manner that the beverage container is prevented from dislodging during transport of the golf bag.

Broadly, the beverage storage apparatus comprises a collar adapted to engage a margin of the bag proximate to the rim and a receptacle which operates to removably receive and support the beverage container during transport. A support structure is also provided which interconnects the collar and the receptacle so that the receptacle is maintained at a fixed location relative to the golf bag by the collar.

The collar has a channel formed therein within which the rim of the bag is matably received and appropriate fasteners, such as nut and bolt pairs, may be employed to secure the collar to the golf bag. Preferably, the collar is formed of a stiff material to provide a backing; this helps to prevent any premature deformation of the rim margin.

The receptacle for the beverage container may be located interiorly of the rim and formed as a chamber having a chamber interior, a bottom and an unobstructed opening opposite the bottom through which the beverage container is received. When located interiorly of the rim, it is preferred that the receptacle be generally centered about a central longitudinal axis of the golf bag so that the unobstructed opening is oriented co-planarly with the open mouth. In this orientation, the beverage container within the receptacle is maintained in an upright position when the golf bag is supported on its base. The receptacle may also include a cushioned support within the chamber interior which cushioned support is defined by a lining secured to an inner wall of the receptacle by an adhesive material or other conversational means. This cushioned support is preferably formed of a thermal insulating material.

To allow for additional support for the beverage container as the golf bag is transported, a pair of cooperative releasable fasteners, such as one or more magnetic elements, are employed to secure the container to the bottom of the receptacle. In addition, a spring latch mechanism may also be mounted to the bottom of the receptacle to permit the container to be stored therein in at least two discrete positions.

As with the construction of the receptacle, the beverage container may also take on a variety of configurations. Regardless of the configuration chosen, it is preferred that the container be thermally protected to reduce heat transfer therethrough and that its access opening be oriented in the longitudinal direction to avoid unnecessary spillage during transport of the golf bag.

The support structure of the present invention can interconnect either the receptacle to the collar or the receptacle to the golf bag. When the receptacle is located interiorly of the rim, it is preferred that the support structure be formed as a plurality of spaced divider elements which each interconnect the collar to the receptacle, thereby to partition the interior adjacent the neck portion into a plurality of compartments through which various ones of the golf club shafts may be inserted. These dividers extend in radial directions between the collar and the receptacle.

These and other objects of the present invention will become more readily appreciated and understood from a consideration of the following detailed description of the exemplary embodiment of the present invention when taken together with the accompanying drawings, in which:

DETAILED DESCRIPTION OF THE EXEMPLARY EMBODIMENTS

The present invention relates to a beverage storage apparatus which is adapted for use with a conventional golf bag. Generally, the beverage storage apparatus of the present invention is mountable to the golf bag and is adapted to removably receive and support a beverage container in such a manner that the beverage container is prevented from dislodging during transport of the golf bag. The following detailed description of the exemplary embodiment describes the beverage storage apparatus of the present invention in use with a conventional golf bag which carries various sizes of golf clubs. However, it should be appreciated that the beverage storage apparatus can also be employed with other golf bags of different types and configurations.

Figure 1:
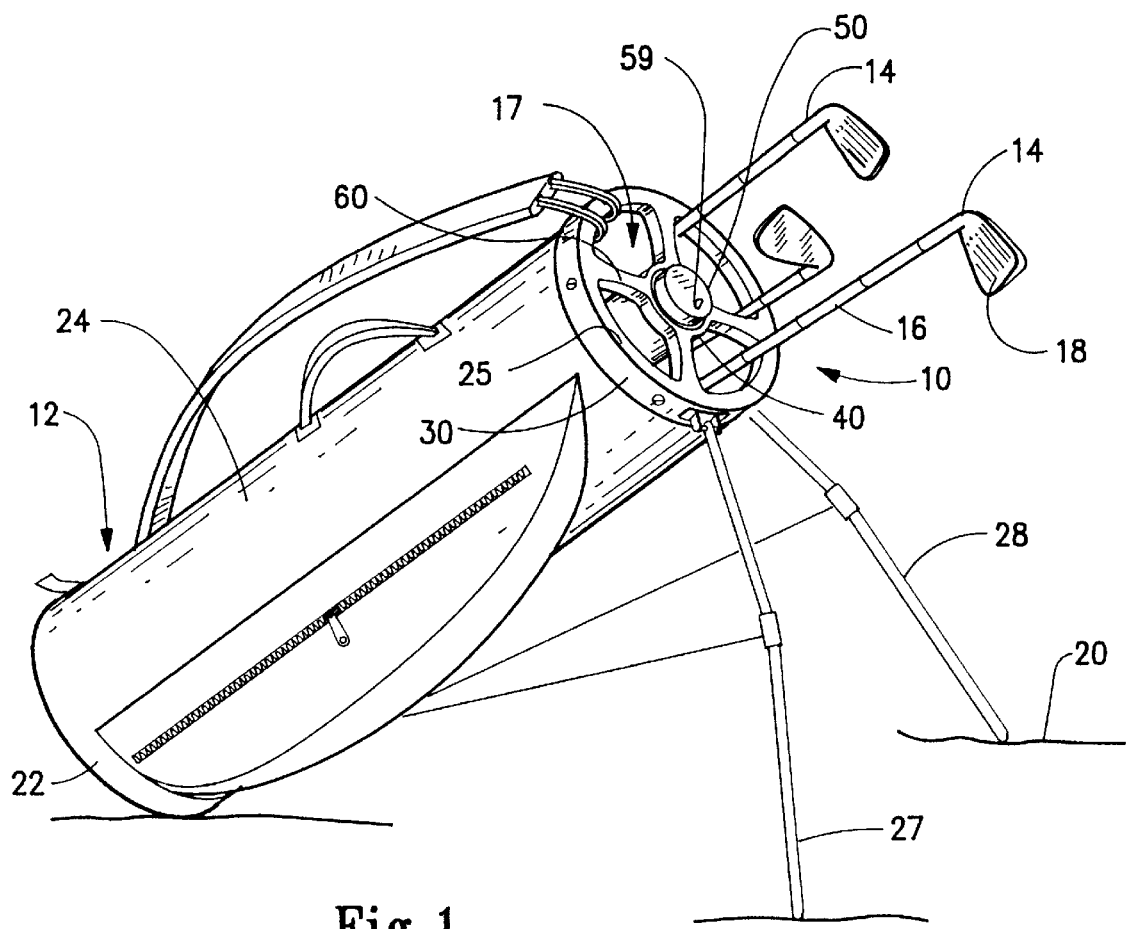
FIG. 1 is a perspective view of a beverage storage apparatus according to the exemplary embodiment of the present invention in use with a conventional golf bag that is supported upon a surface.
Figure 2:
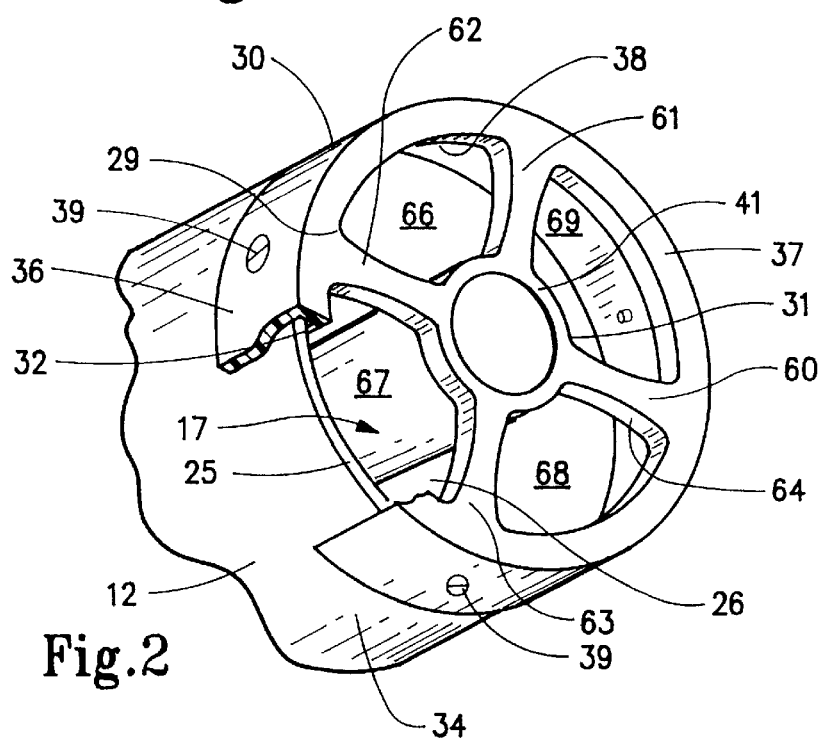
FIG. 2 is an enlarged perspective view of the beverage storage apparatus of the present invention partially broken away to show its mountability to a margin of the golf bag proximate the rim.
Figure 3:
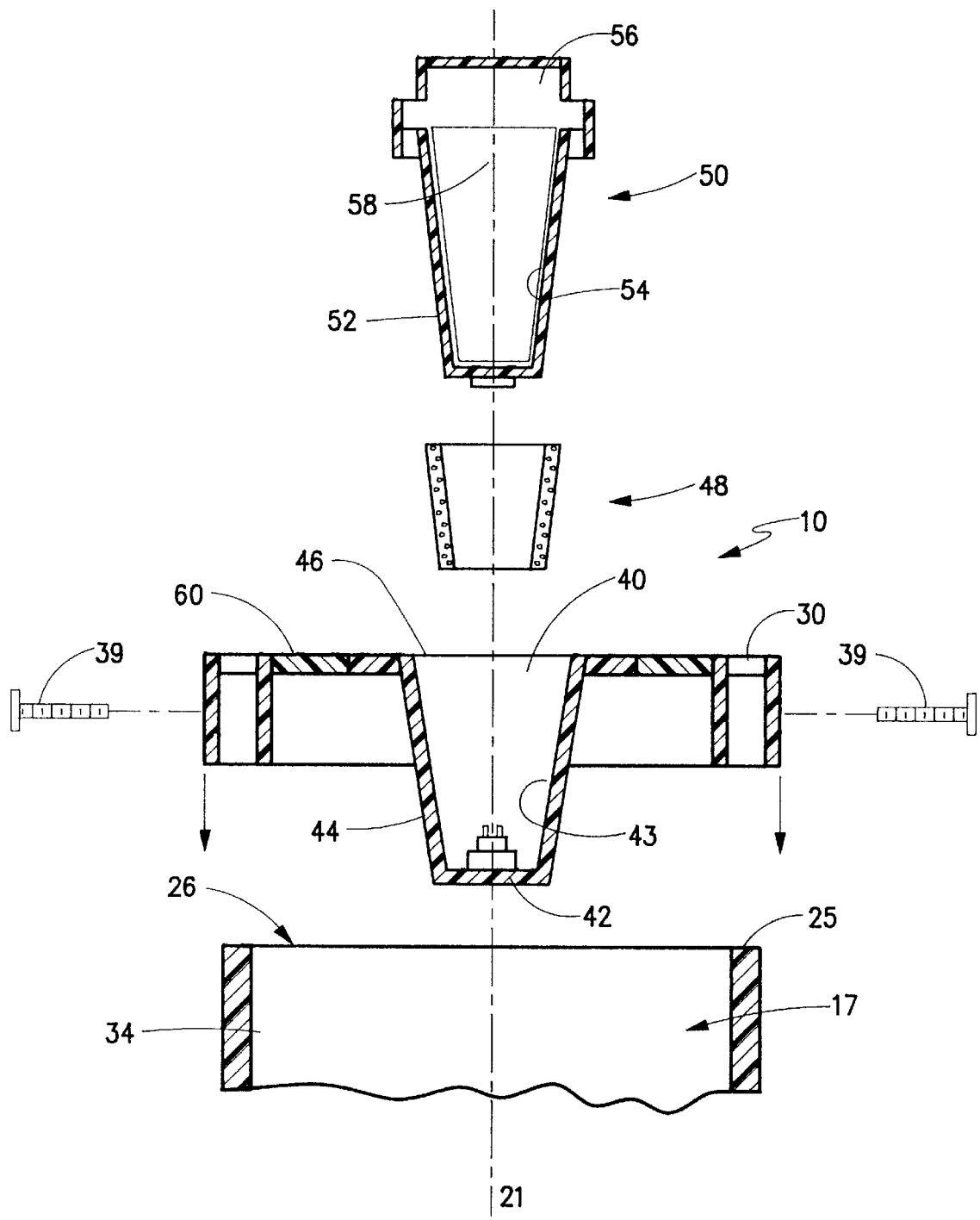
FIG. 3 is an exploded side view in crosssection of the beverage storage apparatus of the present invention shown in use with a beverage container.

An exemplary embodiment of a beverage storage apparatus 10 of the present invention is generally shown in FIGS. 1, 2 and 3. The beverage storage apparatus is adapted for use with a conventional golf bag 12 which is adapted to house and transport various shapes and sizes of golf clubs 14. Conventional golf clubs 14 are employed to strike a golf ball in the direction of a target pin and each has a shaft 16 and a club head 18 which is attached to shaft 16. Golf bag 12 is supported on a support surface 20 and has a base 22 and an elongated surrounding sidewall 24 which extends from the base 22 to terminate at a rim 25 thereby forming an interior 17 for golf bag 12. The interior 17 is sized to house the shafts 16 of the various golf clubs 14.

Sidewall 24 is a tubular structure having a generally uniform diameter throughout. This particular golf bag 12 includes a pair of divergent legs 27, 28 which, together with base 22 form three points of contact for supporting golf bag 12 at an angle relative to support surface 20. While the golf bag shown in FIG. 1 includes legs 27 and 28 to enable it to be supported on support surface 20, it should be understood in light of the description of the invention contained herein that the beverage storage apparatus 10 of the present invention can be employed with other types of golf bags, i.e. stand alone bags or other bags supported on a surface in a different manner.

Broadly, then, the beverage storage apparatus 10 comprises a collar 30, a receptacle 40 and a support or mounting structure 60 which interconnects collar 30 to receptacle 40. A beverage container 50 is receivably supported by receptacle 40 in such a manner that beverage container 50 is prevented from dislodging during use of golf bag 12.

As shown in FIG. 2, collar 30 has a circumferential channel 32 which follows the contour of an open mouth 26 (defined by rim 25) and is adapted to engage and matably receive a rim margin 34 of golf bag 12 proximate the rim. Channel 32 is formed by outer circumferential sidewall 36 and an inner circumferential sidewall 38 which are joined to each other by a shoulder 37 having a width greater than the width of rim margin 34. Collar 30 is secured to rim margin 34 by a plurality of fasteners 39, here shown as matable pairs of nut and bolt assemblies, which extend completely through outer sidewall 36 margin 34 and inner sidewall 38. It is preferred that collar 30 be formed of a stiff material, such as plastic, to provide a backing in order to prevent deformation of margin 34 during use of golf bag 12.

FIG. 2 also shows a desirable construction of support structure 60 of beverage storage apparatus 10. As mentioned, support structure 60 interconnects collar 30 to receptacle 40. Here, support structure 60 is formed as a plurality of spaced divider elements 61–64 which respectively interconnect collar 30 to receptacle 40. These divider elements have distal ends 29 which are connected to inner circumferential sidewall 38 and proximal ends 31 which are themselves connected to a radial flange 41 located on receptacle 40. In this embodiment, then, the entire beverage storage apparatus 10 is formed as a one piece, unitary construction. Divider elements 61–64 are spaced apart from one another to partition the interior 17 of golf bag 12 adjacent its open mouth into a plurality of compartments 66–69. Compartments 66–69, thus, form regions through which various ones of golf clubs 14 may be inserted and stored. Such compartmentalization is advantageous for those golfers who prefer to organize their golf clubs 14 within golf bag 12 in a particular manner. The particular construction of divider elements 61–64, understandably, could take on a variety of forms. For instance, these dividers may extend further into interior 17 toward base 22 to prevent golf clubs stored in each of the compartments 66–69 from contacting the shafts of golf clubs located in adjacent compartments. In addition, the number of divider elements chosen is a matter of preference, as well as their spacial distribution within interior 17.

Details of the relative orientation of the beverage storage apparatus 10 of the present invention may be best appreciated with reference to FIG. 3. While receptacle 40 could be located at numerous fixed locations relative to golf bag 12 (that is, exteriorly of sidewall 24 or interiorly thereof) it is preferred that support structure 60 interconnect receptacle 40 to collar 30 so that receptacle 40 is located interiorly of rim 25 and is centered about a central longitudinal axis 21 of golf bag 12. This construction of the beverage storage apparatus is preferred because receptacle 40 is conveniently located so that beverage container 50 is easily accessible during use. Moreover, receptacle 40 will not interfere with the golfer while carrying golf bag 12.

Here, receptacle 40 is formed as a frusto-conical chamber to provide additional room for the club shafts within interior 17. The chamber has a bottom wall 42 and a surrounding chamber sidewall 44 which extends upwardly from bottom 42 to terminate at an unobstructed opening 46. Opening 46 is positioned to be at a co-planar relationship to open mouth 26 so that an upper most portion of the receptacle terminates at the bag's open mouth 26 while the remainder of the receptacle is disposed entirely within interior 17.

Receptacle 40 is sized to matably receive and support a beverage container 50, also shaped generally as a frusto-conical body. An interior lining 48, shown here as a resilient member, is shown to be inserted within receptacle 40 prior to insertion of beverage container 50 in order to provide a cushioned support and insulation for beverage container 50. This interior lining 48 is secured to interior wall 43 of receptacle 40 by an adhesive material 100 or other conventional means.

It is preferred that beverage container 50 be thermally protected in order to reduce heat transfer therethrough. Accordingly, beverage container 50 is provided with an insulated layer 52 which surrounds an interior vessel 54 that stores a liquid beverage. A lid 56 is releasable secured to the top portion 58 of beverage container 50 to allow access to the contents therein. Access may also be obtained through an access opening 59 (shown in FIG. 1) to avoid the need to remove lid 56.

Figure 4A:
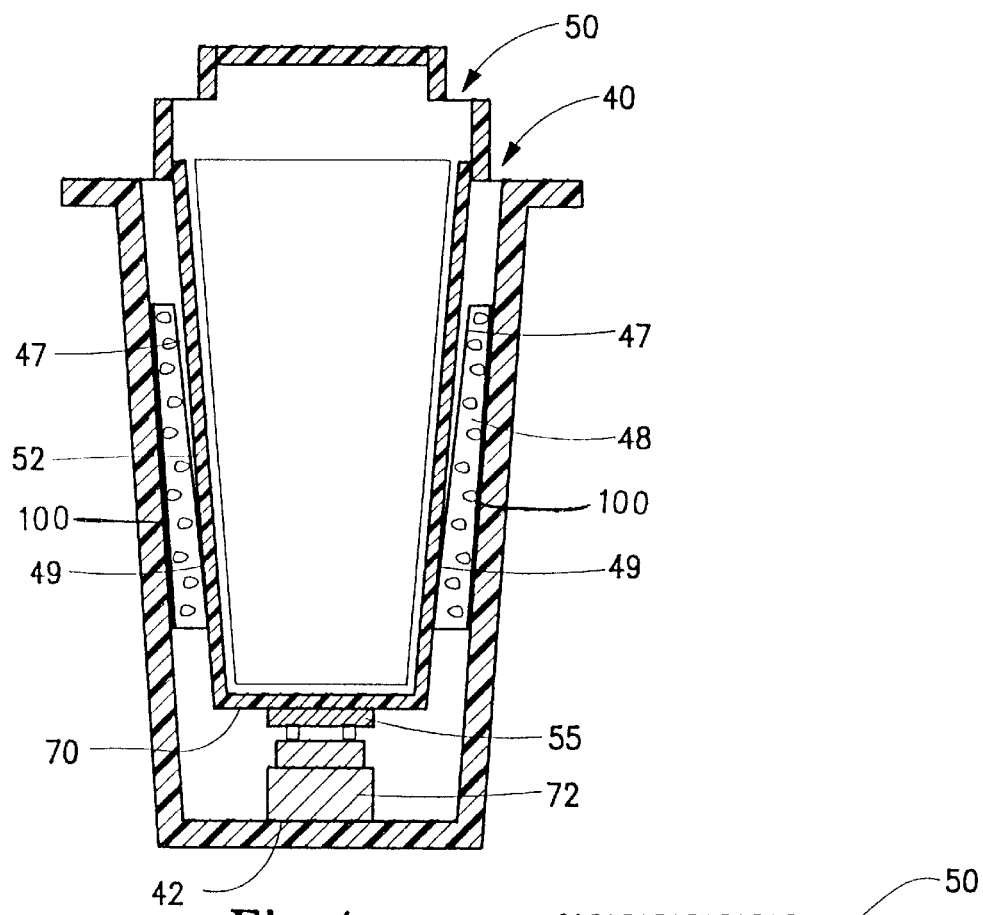
FIG. 4(a) and 4(b) are cross-sectional views in elevation showing the beverage container receivably supported in a receptacle at two discrete vertical positions by the releasable spring latch.
Figure 4B:
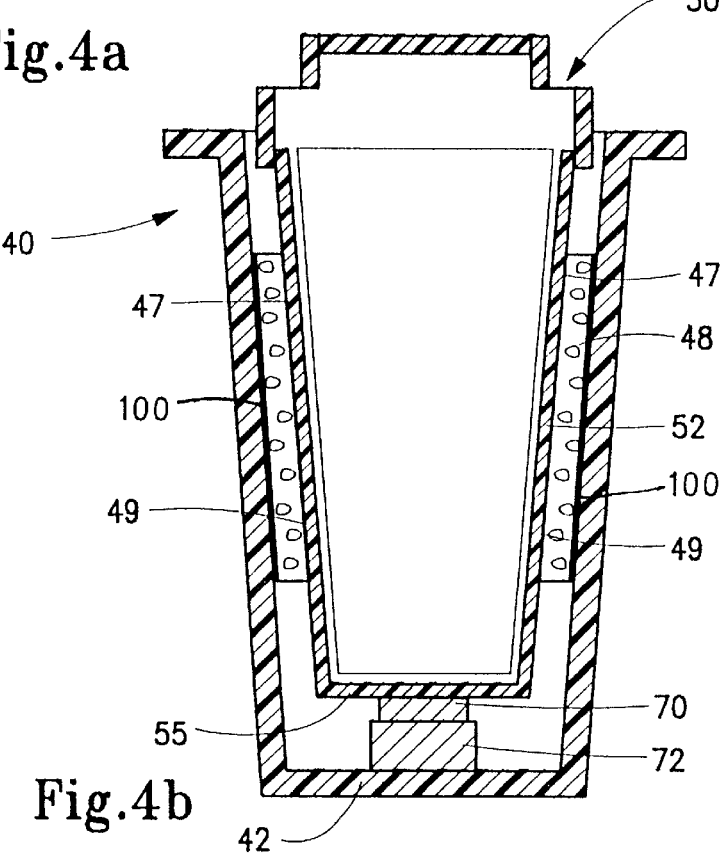

In FIGS. 4(a) and 4(b) it is shown that beverage container 50 may be additionally supported in receptacle 40 by a pair of cooperative releasable fasteners 70 and 72 located, respectively, on the bottom surface 55 of beverage container 50 and the bottom wall 42 of receptacle 40. Here, these cooperative releasable fasteners 70, 72 are shown as a pair of ferro-magnetic elements. Of course, other types of cooperative releasable fasteners, such as velcro, screw release or the like, may be used to provide additional support for beverage container 50 within receptacle 40. Releasable fastener 72 is a conventional spring latch mechanism which permits beverage container 50 to be disposed within receptacle 40 in at least two discrete vertical positions.

The first position, as depicted in FIG. 4(a), corresponds to the position beverage container 50 might be in when one is ready to remove the container from receptacle 40. Here beverage container 50, while still supported by receptacle 40 so as to prevent dislodgement therefrom during use, may be removed without difficulty because the interior lining 48 does not provide a cushioned support throughout. It may be seen that a lower surface area 49 is matably engaged with thermal layer 52 while an upper surface area 47 is not. FIG. 4(b), on the other hand, illustrates the position beverage container 50 would be in when it is not desirable to remove beverage container 50 from receptacle 40. Here, both the lower surface area 49 and the upper surface area 47 of interior lining 48 are in matable engagement with thermal layer 52 of beverage container 50 thereby to provide the added cushioned support to better maintain beverage container 50 within receptacle 40.

While the foregoing discussion has been limited to both the receptacle and the beverage container having generally frusto-conical shapes, it should be understood by one of ordinary skill that a variety of different constructions for these members may be employed—the main consideration being that, regardless of the particular construction elected, the two will be adapted such that the beverage container is prevented from becoming dislodged from the receptacle while the golf bag is transported. This objective could be accomplished by utilizing a beverage container which is adapted to be matably received within the interior of the receptacle without the need for an interior lining or a pair of cooperative fastening elements. The present invention, however, also contemplates beverage containers having a variety of different shapes and sizes because the interior resilient lining 48 and the pair of cooperative fasteners 70 and 72 are able to accommodate the various beverage containers which might be encountered.

Accordingly, the present invention has been described with some degree of particularity directed to the exemplary embodiment of the present invention. It should be appreciated, though, that the present invention is defined by the following claims construed in light of the prior art so that modifications or changes may be made to the exemplary embodiment of the present invention without departing from the inventive concepts contained herein.

I claim:

1. A beverage storage apparatus adapted to receive a beverage container and adapted to mount to a golf bag that includes a base and an elongated surrounding sidewall that extends longitudinally from said base to terminate in a rim thereby to define an interior of said golf bag with said rim defining a mouth therefor through which shafts of a plurality of golf clubs may be inserted so that said golf clubs are stored in the interior of said golf bag, said beverage storage apparatus comprising:

(a) a collar adapted to engage a margin of said bag proximate to said rim and having a channel sized and adapted to matably receive said rim;
   (b) a receptacle operative to matably receive said beverage container and adapted to removably support said beverage container during transport of the golf bag; and
   (c) a support structure interconnecting said collar and said receptacle such that said receptacle depends from and is maintained at a fixed location relative to said golf bag by said collar.

2. A beverage storage apparatus according to claim 1 wherein said collar is secured to said golf bag by fasteners extending through said margin and said collar.

3. A beverage storage apparatus according to claim 1 wherein said collar is formed of a stiff material to provide a backing to prevent deformation of said margin.

4. A beverage storage apparatus according to claim 1 wherein said support structure is constructed to position said receptacle so that said receptacle is oriented longitudinally of said golf bag.

5. A beverage storage apparatus according to claim 1 wherein said receptacle is located interiorly of said rim margin.

6. A beverage storage apparatus according to claim 5 wherein said receptacle is formed as a chamber having a surrounding chamber sidewall, a bottom wall and an unobstructed opening opposite said bottom wall.

7. A beverage storage apparatus according to claim 6 wherein said receptacle is centered about a central longitudinal axis of said golf bag with said unobstructed opening oriented co-planarly with said open mouth thereby to support said beverage container in an upright position when said golf bag is supported on said base.

8. A beverage storage apparatus according to claim 7 wherein said chamber is frusto-conical in shape.

9. A beverage storage apparatus according to claim 5 wherein said support structure is formed as a plurality of spaced divider elements each interconnecting said collar to said receptacle so as to partition the interior adjacent said open mouth into a plurality of compartments through which various ones of shafts of the golf clubs may be inserted.

10. A beverage storage apparatus according to claim 9 wherein said divider elements extend in radial directions between said collar and said receptacle.

11. A beverage storage apparatus adapted to receive a beverage container and adapted to mount to a golf bag that includes a base and an elongated surrounding sidewall that extends longitudinally from said base to terminate in a rim thereby to define an interior of said golf bag with said rim defining a mouth therefor through which shafts of a plurality of golf clubs may be inserted so that said golf clubs are stored in the interior of said golf bag, said beverage storage apparatus comprising:

(a) a container adapted to receive a beverage and having an access opening;

(b) a receptacle sized and adapted to matably receive said container, said receptacle formed as a chamber having a chamber interior, a bottom and an unobstructed opening opposite said bottom, and including a cushioned support in said chamber interior; and (c) a mounting structure interconnecting said golf bag and said receptacle so that said receptacle is secured to and supported in the interior of said golf bag proximate to the mouth thereof.

12. A beverage storage apparatus according to claim 11 wherein said container is thermally protected to reduce heat transfer therethrough.

13. A beverage storage apparatus according to claim 11 wherein said cushioned support is formed of a thermal insulating material.

14. A beverage storage apparatus according to claim 11 wherein said cushioned support is defined by a lining that is supported by an inner wall of said receptacle.

15. A beverage storage apparatus according to claim 11 wherein said container is secured to said bottom by cooperative releasable fasteners.

16. A beverage storage apparatus according to claim 15 wherein at least one of said cooperative releasable fasteners is a magnetic element.

17. A beverage storage apparatus according to claim 11 wherein said mounting structure includes a collar engaging a margin of said bag proximate to said rim, a plurality of spaced divider elements each interconnecting said collar to said receptacle so as to partition the interior adjacent said open mouth into a plurality of compartments through which various ones of shafts of the golf clubs may be inserted.

18. A beverage storage apparatus according to claim 17 wherein said collar, said divider elements and said receptacle are formed as an integrally molded one-piece construction.

19. A beverage storage apparatus adapted to receive a beverage container and adapted to mount to a golf bag that includes a base and an elongated surrounding sidewall that extends longitudinally from said base to terminate in a rim thereby to define an interior of said golf bag with said rim defining a mouth therefor through which shafts of a plurality of golf clubs may be inserted so that said golf clubs are stored in the interior of said golf bag, said beverage storage apparatus comprising:

(a) a container adapted to receive a beverage and having an access opening;

(b) a receptacle sized and adapted to matably receive said container, said receptacle formed as a chamber having a chamber interior, a bottom and an unobstructed opening opposite said bottom, said container secured to said bottom by cooperative releasable fasteners; and (c) a mounting structure interconnecting said golf bag and said receptacle so that said receptacle is secured to and supported in the interior of said golf bag proximate to the mouth thereof.

20. A beverage storage apparatus according to claim 19 wherein at least one of said cooperative releasable fasteners is a magnetic element.

* * * * *